(12) United States Patent
Welch

(10) Patent No.: US 7,582,245 B2
(45) Date of Patent: Sep. 1, 2009

(54) METHOD OF MANUFACTURING AN INSECT COIL

(75) Inventor: Kenneth J. Welch, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 656 days.

(21) Appl. No.: 10/879,393

(22) Filed: Jun. 29, 2004

(65) Prior Publication Data

US 2005/0285296 A1    Dec. 29, 2005

(51) Int. Cl.
B28B 7/14 (2006.01)
B27N 3/18 (2006.01)
A01N 25/00 (2006.01)
A01N 25/34 (2006.01)
A01N 65/00 (2006.01)
A01M 13/00 (2006.01)
A21C 3/04 (2006.01)

(52) U.S. Cl. ............... 264/319; 264/163; 424/405; 424/411; 514/65; 43/127; 428/906; 425/295

(58) Field of Classification Search ............ 264/129, 264/163, 319; 424/405, 411; 514/65; 43/127; 428/906; 425/295
See application file for complete search history.

(56) References Cited

U.S. PATENT DOCUMENTS 4,144,318 A    3/1979  D'Orazio
5,225,128 A  *  7/1993  Katsuragawa et al. ......... 264/79
5,447,713 A    9/1995  Elsner et al.
5,657,574 A    8/1997  Kandathil et al.
D385,942 S    11/1997  Kandathil
6,419,898 B1 *  7/2002  Flashinski et al. ............. 424/40

FOREIGN PATENT DOCUMENTS

GB             226231 A     6/1993
WO     WO 2004/002222 A1   1/2004

OTHER PUBLICATIONS

Maciver, Mosquito Coils, Part I: "General Description of Coils, their Formulation and Manufacture," Pyrethrum Post. 7, (2), pp. 22-27 (1963).
Maciver, Mosquito Coils, Part III: "Factors Influencing the Release of Pyrethrins from Coils," Pyrethrum Post. 7, (3), pp. 15-17 and 19 (1964).

* cited by examiner

*Primary Examiner*—Monica A Huson
*Assistant Examiner*—Michael T Piery

(57) ABSTRACT

A method of manufacturing an insect coil includes the steps of feeding a sheet of dough material which includes an active insect control ingredient dispersed therein in a first direction, cutting the sheet of dough material with a die to form an insect coil, ejecting the insect coil from the die, and applying an extra dose of active to a specific location on the coil while the coil is being ejected from the die. Preferably, the extra dose of active is applied as a droplet using capillary forces that develop between the upper surface of the insect coil and the droplet itself and is forced through a tube located above the desired location. The insect coil may be tip treated only or may be zone treated at a plurality of spaced locations.

8 Claims, 3 Drawing Sheets

METHOD OF MANUFACTURING AN INSECT COIL

BACKGROUND OF THE INVENTION

The present invention relates in general to burnable coils for the control of insects, and more particularly to a method of and apparatus for zone treating or tip dosing coils during their manufacture.

Insect coils for controlling mosquitoes and other flying insects are well known. Conventional coils are typically manufactured by preparing a dough made up of materials that, when dry and ignited, will slowly burn releasing an insecticide into the atmosphere. The active insecticide ingredient is typically uniformly disbursed in the dough during blending of the dough ingredients, or by surface treating the dough. In general, there are four basic components of an insect coil, namely, an active insecticide ingredient, an organic filler capable of smoldering well, a binder, and additives such a dye or a fungicide. Coils are formed usually as a sheet of material cut or otherwise formed into a spiral shape. For economy of operation and strength of the resulting coils it is convenient to cut the sheet of material in a coil within a coil pattern, i.e. two coils one within the other which, when dried, can be simply separated by gently disengaging one from the other. As an example, see U.S. Design Patent 385,942.

D'Orazio U.S. Pat. No. 4,114,318 is a typical example of a conventional insect coil. D'Orazio describes the formation of a sheet of dough throughout which insecticide is uniformly mixed. The sheet of dough is subsequently formed into the desired coil shape. Another example is Elsner et al. U.S. Pat. No. 5,447,713 which illustrates a board of dough from which coil shapes are punched or cut. Elsner et al. also describes the surface treatment of the board of dough or of the punched out coil with a layer of insecticide uniformly and continuously applied with rollers.

When the outermost end or tip end of a conventional coil is lit, the active ingredient in the coil located immediately beside the burning tip end is heated and volatizes. Conventional coils traditionally have been valued in part for their ability to deliver a continuous, linear discharge of volatile active insecticide ingredient over a considerable length of time, i.e. 3-8 hours or more, in order to control insects, especially mosquitoes.

It is also known that zone treating or tip dosing of insect coils yields performance advantages. See for example Flashinski et al. U.S. Pat. No. 6,419,898 and Kandathil et al. U.S. Pat. No. 5,657,574. By this means, the coil is made to deliver an active insecticide ingredient at a greater rate when it is first lit. This higher initial dose of active insecticide ingredient is intended to quickly establish an effective insect controlling level of active insecticide ingredient in the previously untreated air in the vicinity of the coil. Kandathil et al. accomplishes this goal by utilizing a greater cross-sectional area near its tip end, while Flashinski et al. accomplishes a similar goal by applying an auxiliary coating of the active insecticide ingredient at the tip end of the coil.

While it is advantageous to zone treat or tip dose an insect coil, it is difficult to precisely place the extra dose on the coil during the manufacture of such coils, especially in a high-speed automated process. In such a process, a sheet of dough travels through a cutting machine, and a cutter or die presses down or stamps into the dough from above cutting out the desired shape of the coil. Since the dough is still wet, the cut coil remains in the die while the die lifts and swivels so as to locate the now cut coils above a drying pan, and then lowers the cut coil toward the pan. An ejector plate pushes the cut but still wet coil out of the die allowing it to drop to the drying pan. The ejector is substantially the shape of the coil so that the entire still wet coil is uniformly ejected from the die. The pan which is also typically on a conveyor then is moved to a drying oven where the coil is dried.

Typically, as noted above, an insecticide is uniformly mixed into the dough before the coils are cut, although it is also known to apply active to the surface of a dry coil by spraying or rolling the active insecticide ingredient onto the surface of the coil. In any event, if one desires to add an extra dose of active to a specific location on the coil, whether the coil is wet or dry, it is necessary to orient the coil so that a sprayer or other dosing mechanism will be precisely over the location that is to receive the extra dose. Automated means of orientating the coils depend on interacting with the shape of the coils. However, mechanical orientating devices yield inexact results, especially for standard, essentially round spiral coils which is due in part because coils dry to slightly different sizes, or may warp slightly upon drying, and in general have variations in shape. Any error in precise orientation of the coils with respect to the dosing mechanism causes errors in dose location, resulting in a unacceptably large number of defective coils.

SUMMARY OF THE INVENTION

The method of and apparatus for manufacturing an insect coil in accordance with the present invention avoids the problems associated with errors in the precise orientation of the coils with respect to dosing mechanisms by adding the extra dose of active ingredient at the point that the coil is held in a precise and predictable orientation, i.e. when the coil is still held in the die. The ejector is equipped with one or more dosing tubes having a port or ports is so located as to be disposed above the desired location for the zone treating or tip dosing the wet coil as the ejector ejects the coil from the die. As the ejector pushes the coil out onto the drying pan, and just as the coil is released from the die, the dosing port delivers a dose of active in the form of a droplet or a spray, droplet application being preferred. The droplet is allowed to touch the top surface of the coil and is pulled downwardly onto the top surface of the coil by capillary action as the coil moves away from the die.

Timing of the dose delivery by the dosing port is important. If delivered while the ejector is pressing against the surface of the coil, the droplet spreads between the ejector surface and the coil, which effect fails to create the focused dose location desired. If the droplet is delivered late, i.e. after the ejector has mostly withdrawn from the die, the droplet will not be large enough to the touch the coil and will not transfer to the coil. Further, it is advantageous to keep the total amount of liquid in the extra dose as small as possible to discourage dose migration and dilution. Dose migration and dose dilution increase as larger amounts of liquid soak and migrate within the coil, making the ideal extra dose, a very small, concentrated droplet. Consequently, the droplet must be delivered just as the ejector begins to back away from the surface of the ejected coil, while the dosing port is close enough to the coil that a small droplet of auxiliary active is large enough to touch the coil surface and transfer thereto.

It is also advantageous for insect coils that are tip dosed or zone treated be visually different from conventional coils. In order to accomplish this, a dye can be included in the auxiliary droplet. Alternately, the ejector can include either a positive or negative feature that leaves a visible mark on the wet coil. No matter which method is employed, however, it is desirable to utilize a feature that causes the least interference with reliable coil burning. It has been discovered that even small variations in the manner in which coils are dyed, sized, pressed, or otherwise configured can cause the coil to extinguish at the point where the variation occurs.

Thus, in order to accomplish the above, the present invention provides a method of manufacturing an insect coil comprising the steps of providing a sheet of dough material comprising an insect coil composition, cutting the sheet of dough material with a die to form an insect coil, ejecting the insect coil from the die, and applying a fluid mixture containing an active insecticide ingredient to the insect coil while the coil is being ejected from the die.

The apparatus of the invention for dosing an insect control coil with an insect control active substance at a preselected location on the coil includes a die formed in the shape of the coil to be dosed, the die being adapted to cut a coil from a sheet of dough material. An ejector is provided that is insertable within the die and so moveable as to eject a cut coil held within the die, the ejector having a dosing port to deliver controlled doses of the insect control active substance. The dosing port is located above the location on coils cut by the die that is to receive a dose of insect control active substance. Alternatively, there may be multiple dosing ports to deliver doses of insect control active substance to multiple locations on coils.

BRIEF DESCRIPTION OF THE DRAWINGS

The drawings illustrate the best mode presently contemplated in carrying out the invention.

In the drawings.

DETAILED DESCRIPTION OF THE INVENTION

Figure 1:
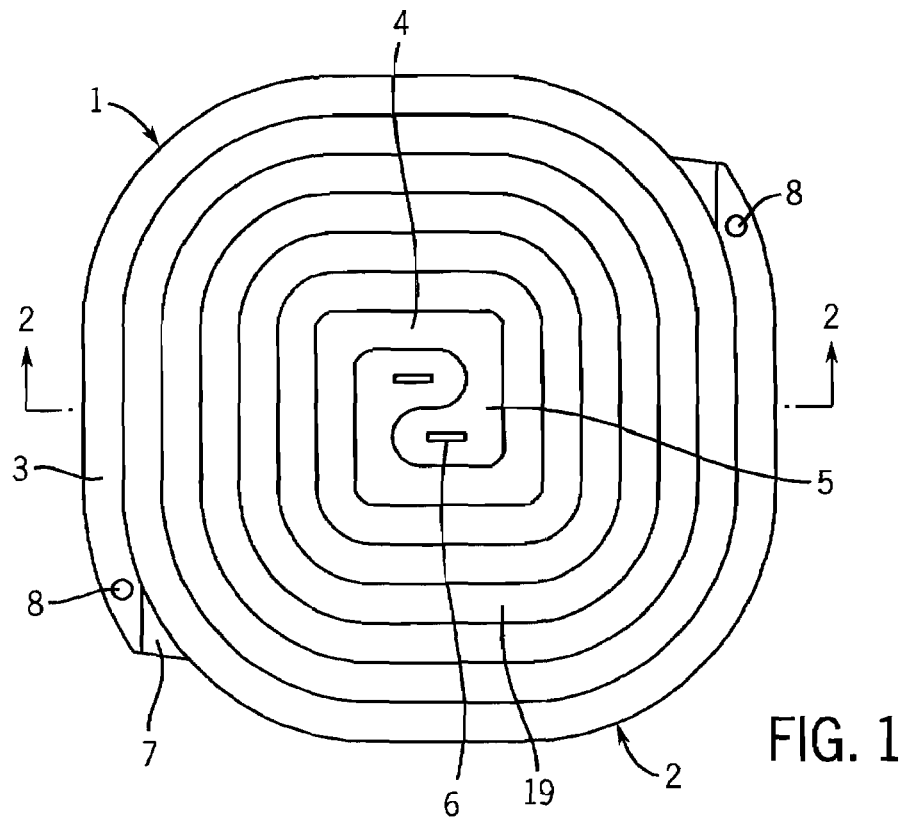
FIG. 1 is a top plan view of a tip treated insect control coil manufactured in accordance with the method of the present invention illustrating two coils which are nested one within the other.
Figure 2:
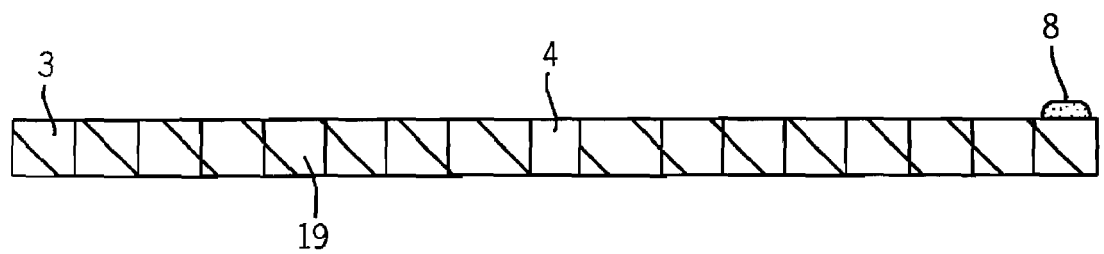
FIG. 2 is a cross-sectional view taken along the plane of the line 2-2 in FIG. 1.
Figure 3:
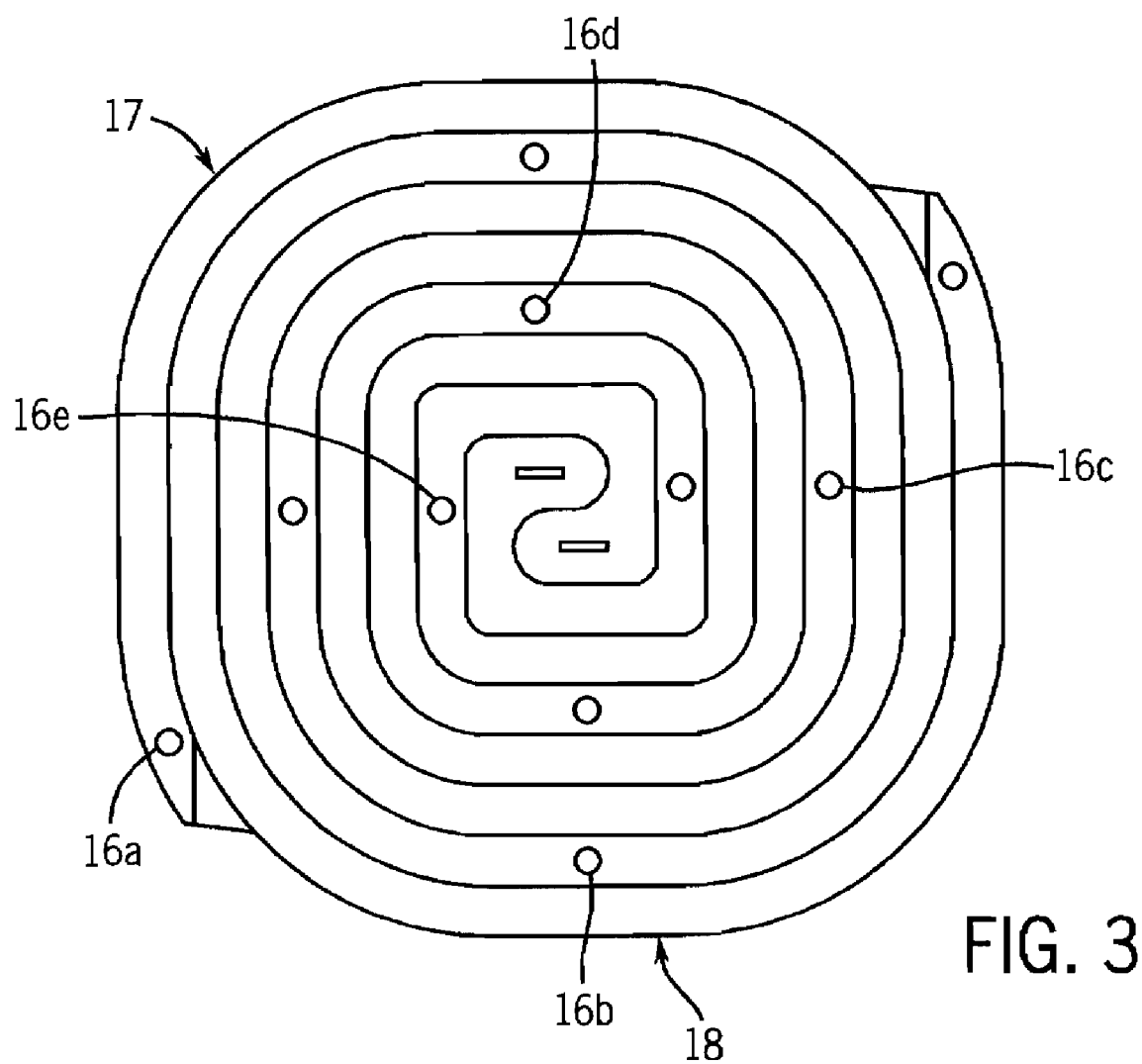
FIG. 3 is a top plan view of a zone treated insect control coil constructed in accordance with the method of the present invention also illustrating two coils which are nested one within the other.

Referring now to the drawings, FIGS. 1 and 2 illustrate a first embodiment of the insect control coil constructed in accordance with the method and apparatus of the present invention. In this invention, two insect control coils 1 and 2 respectively, each a spiral in shape, are nested one within the other. As used herein, the term "spiral" or "spiral-shaped" refers to the path of a point in a plane moving around a central point or axis while continuously receding from or approaching that point or axis. The path of the point may be circular, elliptical, oval, rectangular, triangular, or other geometric shape. For example, the coils 1, 2 shown in FIGS. 1 and 3, are substantially square or rectangular in shape.

The coils 1, 2 are manufactured so that they may be separated from each other prior to use, by pulling them apart. Thus, coils 1, 2 are identical and therefore only coil 1 need be described in detail further herein. Coil 1 comprises a spiral shaped body having an outer tip end 3, an inner tail end 4, and a center section 19. In general, the outer tip end 3 comprises a selected initial portion of the coils 1, 2, measuring from the tip of the coil most remote from the center inwardly for a selected length, while the inner tail end 4 comprises a selected final portion of coils 1, 2, the outer tip end and inner tail, taken together, not encompassing the entire coil. The center section 19 comprises the remaining, middle portion of the length of coils 1, 2. The inner tail end 4 terminates in an enlarged area 5 so as to provide support for a conventional coil stand (not shown) which is received within slot 6 formed therein. As seen best in FIG. 2, coil 1 has a substantially uniform cross-sectional area along its entire length. However, coil 1 could also have a nonuniform cross-sectional area along its length, if desired. In such a circumstance, however, the various regions of coil 1 should smoothly merge into each other without any abrupt changes in size so as to minimize the tendency to crack and/or break during handling.

Preferably, each coil 1, 2 has an outermost ignition section 7 that may (but need not) extend past or beyond tip end 3 and which enables easy lighting of the coil prior to the burning of droplet 8. The ignition section 7 is adapted to light readily (as with a match) by means of a reduction of size, the inclusion of conventional oxidants, or the like. Preferably, the ignition section 7 is tapered to assist in the ignition of the coil 1.

The coils 1, 2 are composed of a burnable base material composed of any well known or conventional combination of ingredients. Representative materials used for the base are wood powder, e.g. saw dust, wood chips, wood fiber, and the like, and various vegetable shell powders, e.g. cocoa shell, peanut shell, and the like which are held together by a binder such as starch, guar gum, and water. However, a wide variety of other conventional and well known slow burning materials can also be used to form the composition of the spiral-shaped body of coil 1. As is well known in the art, various combinations of ingredients may be used to provide a coil which will last for a desired time when burned, i.e. from a few minutes to a few hours.

Coils 1 and 2 are typically used to repel and/or kill flying insects such as mosquitoes which may be present in living quarters or other selected enclosed or open spaces. To this end, coil 1 contains an effective amount of an insect control active ingredient, which can be uniformly dispersed throughout the base or dough material of the coil's body, and may be a repellent, an insecticide, or an insect growth regulator. Generally, this effective amount of the insect control active ingredient is from about 0.01% to about 3.0% by weight of coil 1.

Traditionally, pyrethrum or pyrethroid type materials are useful in mosquito coils. Preferred pyrethroids are pyrethrum, resmethrin, bioallethrin, allethrin, and mixtures thereof. A particularly preferred insecticide is allethrin. Other insect control active ingredients can be used such as the repellents citronella, lemon grass oil, lavender oil, cinnamon oil, neem oil, clove oil, sandalwood oil, and geraniol, as well as an insect growth regulator such as hydroprene.

Coils 1 and 2 may also incorporate other burning aids which assist in sustaining the burning of the coil. Traditional and conventional burning aids can be utilized such as sodium and potassium nitrate, and mixtures thereof. Other standard ingredients may be incorporated into the base material of coils 1 and 2, such as dyes, pigments, perfumes, fungicides and preservatives.

The term "insect coil composition" is thus intended to mean any burnable composition intended for use as an insect coil. Typically, such composition includes an active ingredient, an organic filler capable of smoldering well, a binder, and additives such as a dye, fungicide, or burning aids.

There are a variety of techniques for manufacturing coils 1 and 2. In one method, the powders are mixed together until uniformly blended whereupon the blend is added to a water/starch mixture to create a dough-like mass. When this dough-like mass is essentially uniform, the insect control active ingredient is blended in until uniformly dispersed therein. The dough is then preferably extruded into a ribbon or flat sheet and cut into the desired coil shape with a die. After the coils are formed, they are then dried by any conventional means such as an oven.

As shown best in FIGS. 1 and 2, coil 1 also includes a droplet 8 on the outer or tip end of the spiral-shaped body. In one embodiment, droplet 8 contains as one ingredient thereof an auxiliary amount of an insect control active substance which provides an auxiliary burst of active substance when heated as the coil in its vicinity burns. In other words, when droplet 8 is heated, it provides an initial burst of a high concentration of insect control active into the environment so as to provide a fast acting initial dose to provide quick coverage of a room or other space with an insect control active ingredient such as a repellent, an insecticide, or an insect growth regulator. The insect control active substance contained in droplet 8 may be the same as the active substance dispersed in the body of coil 1, or may be different from the active substance dispersed in the body of coil 1. The composition of droplet 8 may or may not be the same as the composition of coil 1. In this regard, droplet 8 will contain an auxiliary amount of an active ingredient which may be present in a desired concentration so as to provide the initial burst or quick release of the active into the environment and provide the fast acting initial dose. For example, in one embodiment, the body of coil 1 may contain 20 mg of active ingredient uniformly dispersed therein while the droplet 8 may contain 2 mg of an active ingredient. In another embodiment, the body of coil 1 may contain 18 mg of the active ingredient while the droplet 8 has 4 mg therein.

As shown best in FIG. 1, droplet 8 is preferably applied only on all or a portion of the tip end 3 of coils 1 and 2, with the remaining portions of the coils containing either a printed or mixed-in amount of active substance or, alternatively, no active substance. However, as shown in the alternate embodiment of FIG. 3, a plurality of droplets 16a through 16e may also be applied intermittently along the length of coils 1 and 2. With respect to the embodiment shown in FIG. 3, it should be recognized that there are five zones along the length of coils 17 or 18 which contain droplets 16a-16e. The number of zones, the amount of extra dose in each zone, as well as the distance between each zone may be varied, if desired, to vary or correlate with the number of auxiliary "bursts" of active substance, the time duration for each "burst", as well as the time period between each "burst" of insect control active substance. Thus, each coil could contain multiple zones providing multiple auxiliary bursts of the insect control active substance and these zones may be located at any desired location along the length of the coil. As a result, the embodiment shown in FIG. 3 is but one example of the numerous combinations possible.

The droplet 8 may be applied to one or more surfaces of the coil. For example, although it is preferable to apply droplet 8 to the upper surface of the coil, it may also be applied to the edge of the coil or along an outer side surface. In addition, although FIGS. 1-3 illustrate droplet 8 in the form of a droplet, it should be recognized that it may be applied in different configurations such as square, circular, triangular, oval, elliptical, hexagonal, or any other geometric configuration desired. Additionally, with regard to the coil itself, FIGS. 1-3 illustrate a rectangular cross section for the body of the coil. However, it should be recognized that the body of the coil could also be square, circular, triangular, oval, elliptical, hexagonal, or any other geometric configuration desired.

Figure 4:
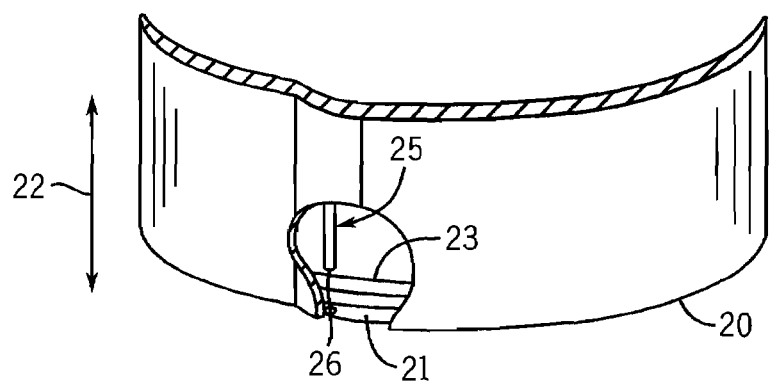
FIG. 4 is an enlarged fragmentary view with parts cut away illustrating a portion of an insect coil held within a cutting die just prior to ejection of the coil from the die.
Figure 5:
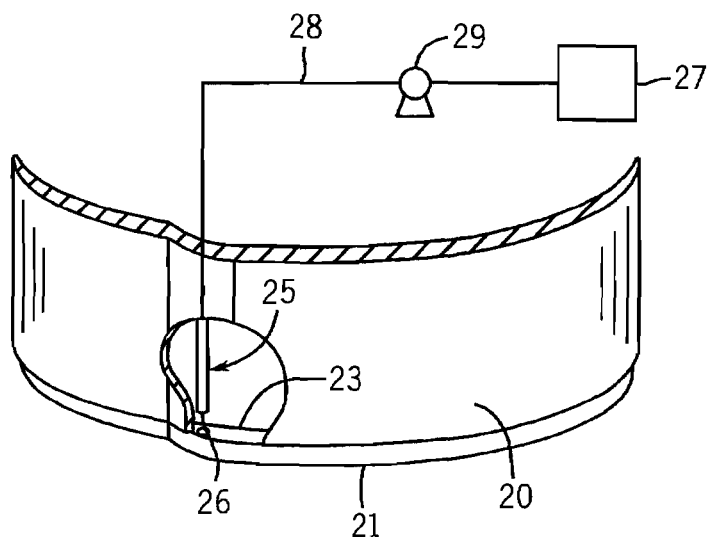
FIG. 5 is a view similar to FIG. 4 illustrating an ejector pushing an insect coil out of the cutting die.
Figure 6:
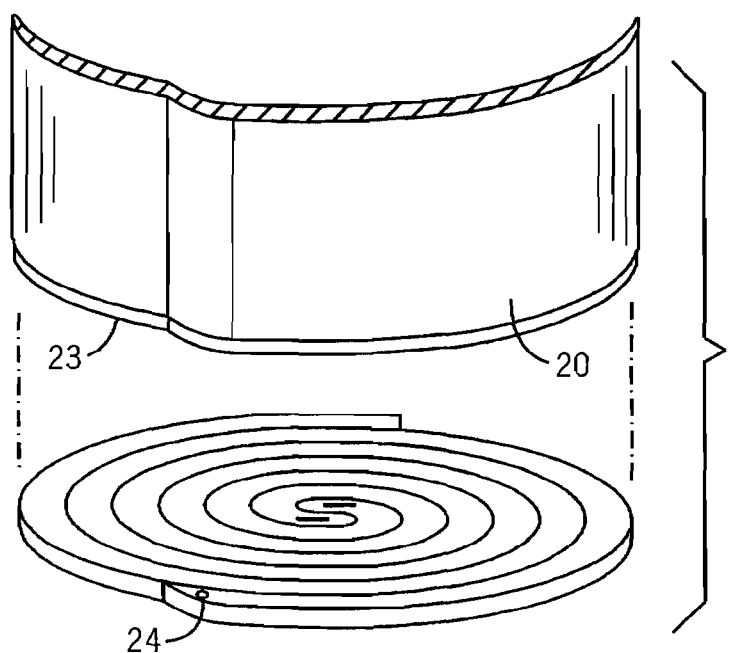
FIG. 6 is a view similar to FIGS. 4 and 5 illustrating an insect coil as it falls from the cutting die with an auxiliary tip dose applied thereto.

Referring now to FIGS. 4-6, there is illustrated the method of manufacturing the coil so as to provide a tip treatment and/or zone treatment for the coil. More specifically, FIG. 4 illustrates the head of a die 20 which moves in a direction transverse to the direction of dough material 21 in a stamping operation to cut the coil from a sheet of dough material 21. In other words, die 20 reciprocates between an extended cutting position and a retracted non-cutting position as illustrated by the arrow 22. FIG. 4 illustrates die 20 immediately after it has cut through dough material 21. As die 20 retracts, the cut coil remains held in the die 20 while the die 20 moves upwardly. The die 20 will then move so as to be above a drying pan (not shown) and then lowers the coil toward the pan. Pans may be discrete, separate pans, or they may be in the form of a continuous, movable surface, such as a conveyor belt, as is conventional in the art.

An ejector 23 in the form of a plate having substantially the shape of the coil slides matingly within die 20. Die 20 is open-topped so as to be able to receive the ejector 23. Only a portion of the ejector plate 23 is illustrated in FIG. 4 for convenience of illustrating the invention. The ejector 23 then pushes the cut, but still wet coil, out of the die 20 allowing it to drop to the pan as schematically illustrated in FIG. 6. As a result, the entire, still wet coil, is uniformly ejected from the die 20 and deposited on the pan. The pan is then moved to a drying oven, where the coil is dried.

Referring now to FIG. 5, there is illustrated the step of tip dosing the coil with an auxiliary droplet 24 of a mixture containing an active insect control ingredient. As illustrated, droplet 24 is applied to the upper surface of the coil by a dosing tube 25 having a dosing port 26 disposed directly above the tip end of the coil. As schematically illustrated in FIG. 5, tube 25 is connected to a source 27 of the fluid mixture via a feed line 28. A pump 29, such as a peristaltic pump, is utilized to dispense the fluid mixture from the dosage port 26 at the desired time so that capillary forces develop between the upper surface of the coil and the droplet pumped from dosage port 26. In order to accomplish this, the dosage port 26 is closely spaced above the upper surface of the dough material 21, and as the coil is ejected from die 20 via the ejector plate 23, pump 29 dispenses a sufficient amount of the fluid mixture to form droplet 8 thereon. Then, as the ejector plate 23 continues to eject the coil, the capillary forces draw the droplet 8 onto the upper surface of the coil until the finished coil falls from the die 20 with the tip dose or droplet 8 applied thereto, as illustrated best in FIG. 6.

As noted earlier, although FIGS. 4-6 illustrate tip dosing, the coil may also be zone treated to provide a coil such as that illustrated in FIG. 3 by using a plurality of dosage tubes 25 located at the appropriate locations above the coil. It should also be noted that the fluid mixture entering tube 25 may be in the form of an aqueous solutions, a gel or a paste, depending upon the specific application desired.

What is claimed is:

1. A method of manufacturing at least two nested insect coils, comprising the steps of:

providing a sheet of dough material comprising an insect coil composition, said dough material having an outer substantially planar upper surface;

cutting said sheet of dough material with a die to form two nested insect coils, both of said insect coils having their own tip end;

ejecting the nested insect coils from the die by moving an ejector between a non-ejecting position and an ejecting position; and applying a fluid mixture containing an active insect control ingredient to the respective tip ends of the insect coils while said coils are being ejected from said die, wherein the step of applying said fluid mixture comprises dispensing, as said ejector initially begins to eject said nested coils, a discreet amount of said fluid mixture to dosing ports disposed closely spaced above the outer upper surface so that said discreet amount of said fluid mixture touches said outer substantially planar upper surface and as the ejector then continues to eject the nested coils from the die in a direction away from said dosing ports capillary forces between said outer substantially planar upper surface and said fluid mixture at said dosing ports draw the discreet amount of said fluid mixture from said dosing ports onto the outer substantially planar upper surface to form a droplet on both of the respective tip ends of both of the coils, while not applying said fluid mixture on top of at least some other portions of said outer upper surface of the coils.

2. The method of claim 1 wherein the step of cutting said sheet of dough material occurs when the sheet of dough material is relatively wet.

3. The method of claim 1 wherein the step of cutting said sheet of dough material comprises stamping said die through said sheet of dough material.

4. The method of claim 1 wherein the step of applying said mixture comprises pumping said mixture through a tube.

5. The method of claim 1 wherein said fluid mixture is selected from the group consisting of an aqueous solution, a gel and a paste.

6. The method of claim 1 wherein the method is conducted such that said mixture is applied to a plurality of spaced zones along said outer upper surface of both of said nested coils.

7. The method of claim 1 wherein said insect coil composition contains an active insect control ingredient which is the same as the active insect control ingredient in said mixture.

8. The method of claim 1 wherein said insect coil composition contains an active insect control ingredient which is different from the active insect control ingredient in said mixture.

* * * * *